Dec. 27, 1949          R. J. HERBOLD          2,492,148
AUTOMATIC NAVIGATING INSTRUMENT FOR CRAFT GUIDANCE
Filed May 13, 1947          6 Sheets-Sheet 2
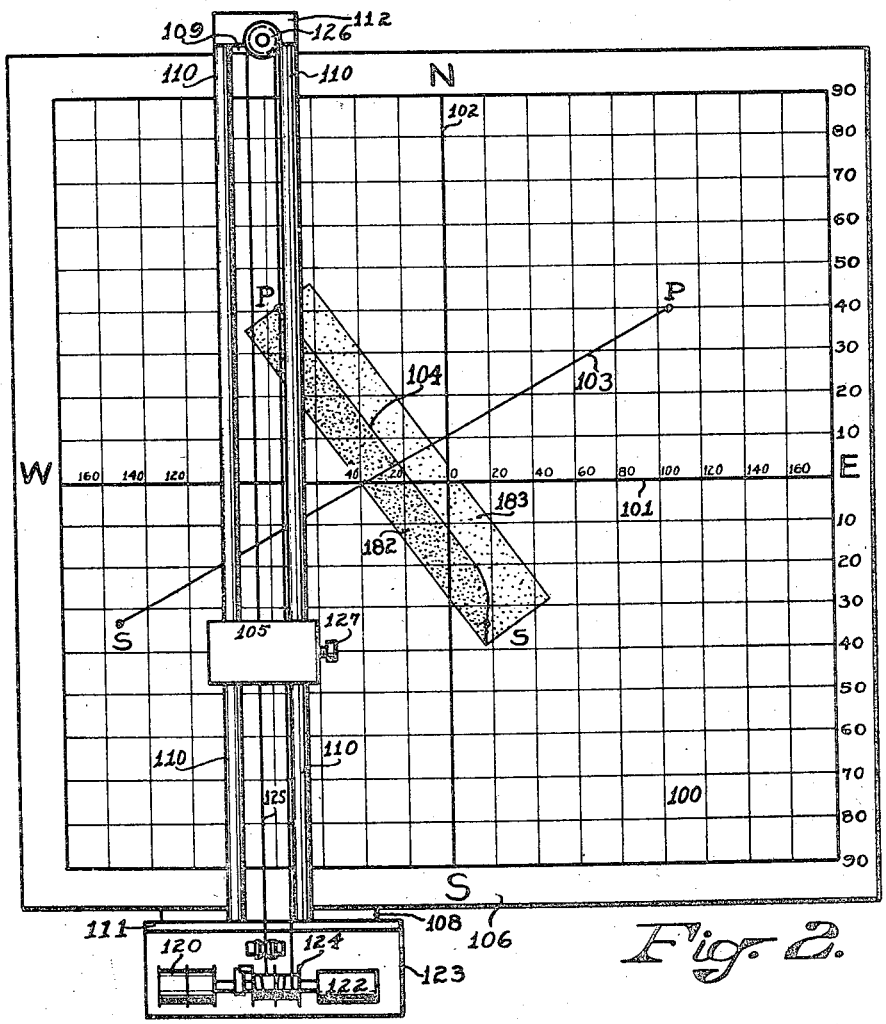
*Fig. 2.*
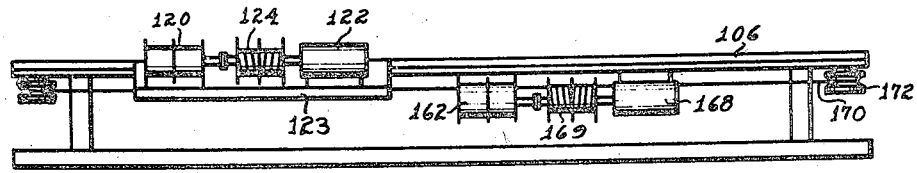
*Fig. 3.*
*Fig. 4.*
Inventor
Robert J. Herbold
By Clayton L. Jenks
Attorney

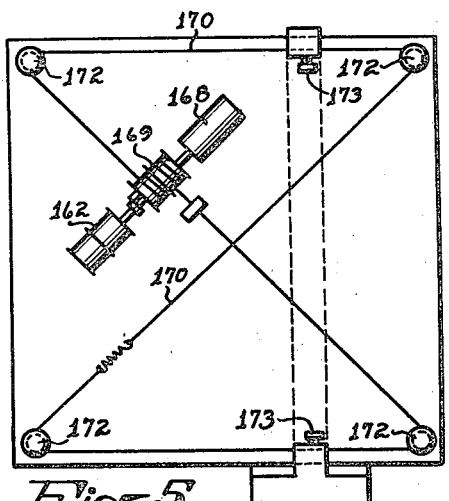
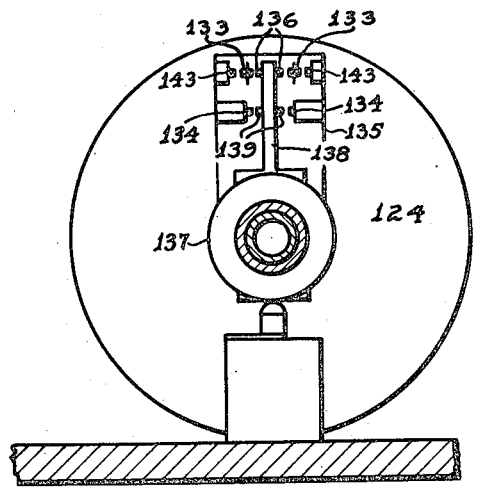
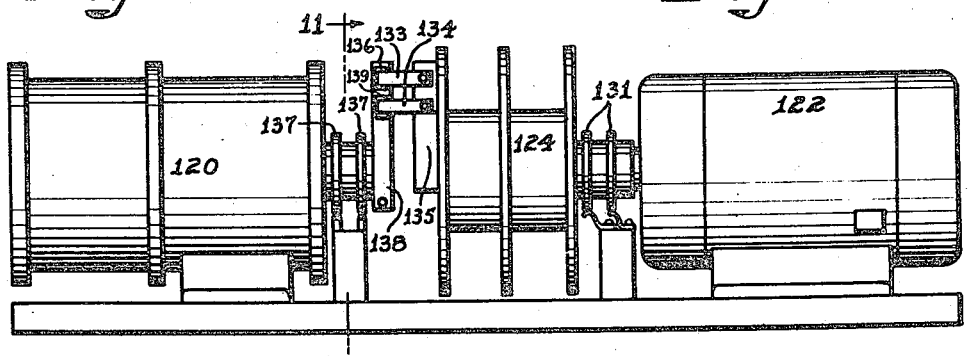
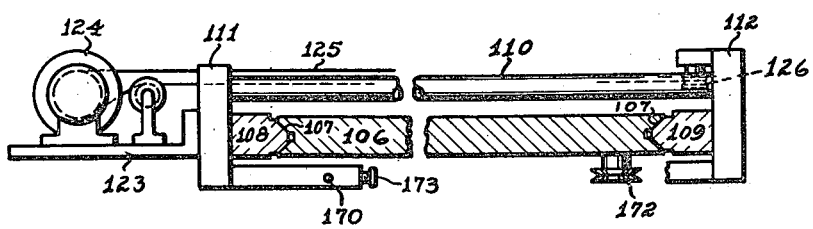

Dec. 27, 1949 R. J. HERBOLD 2,492,148
AUTOMATIC NAVIGATING INSTRUMENT FOR CRAFT GUIDANCE
Filed May 13, 1947 6 Sheets-Sheet 4

Inventor
Robert J. Herbold
By Clayton L. Jenks
Attorney

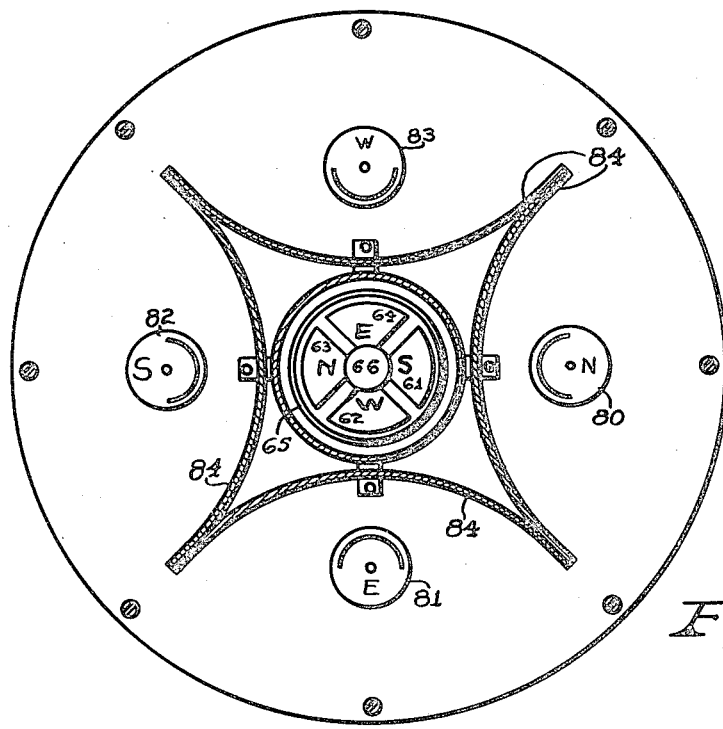
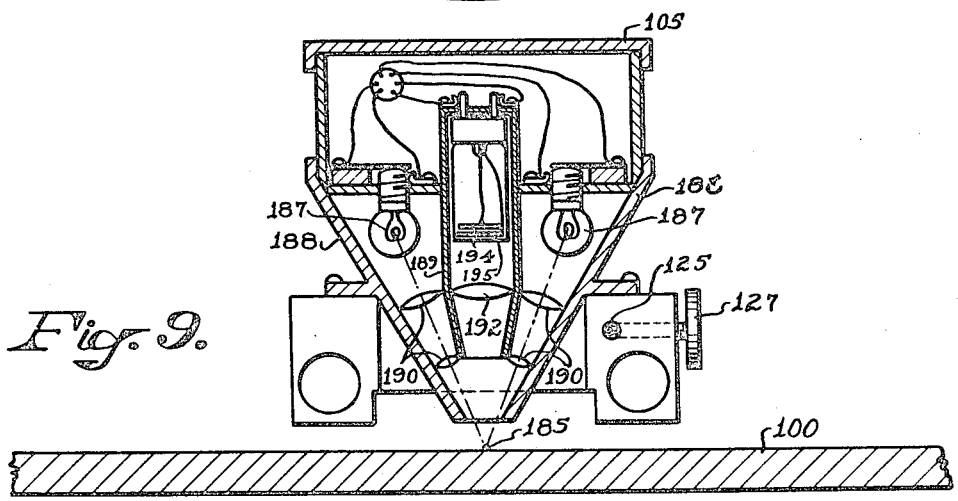

Dec. 27, 1949         R. J. HERBOLD         2,492,148
AUTOMATIC NAVIGATING INSTRUMENT FOR CRAFT GUIDANCE
Filed May 13, 1947                                  6 Sheets-Sheet 6
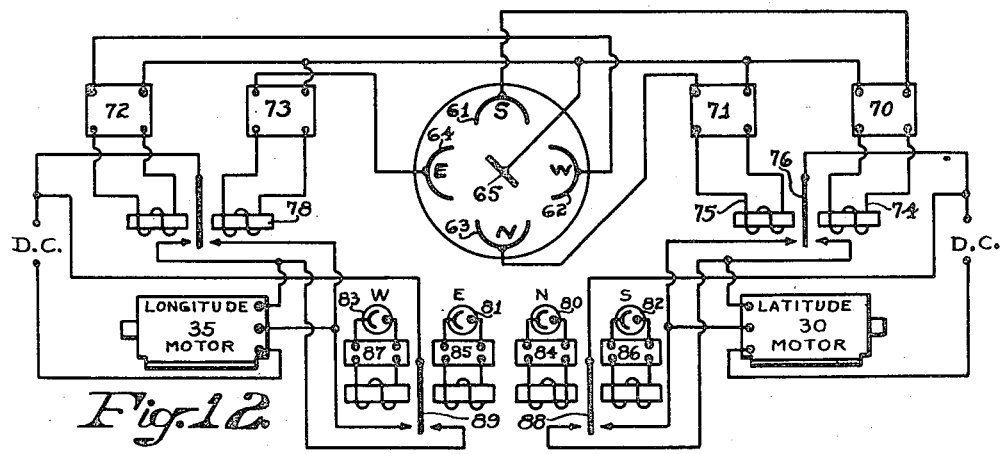
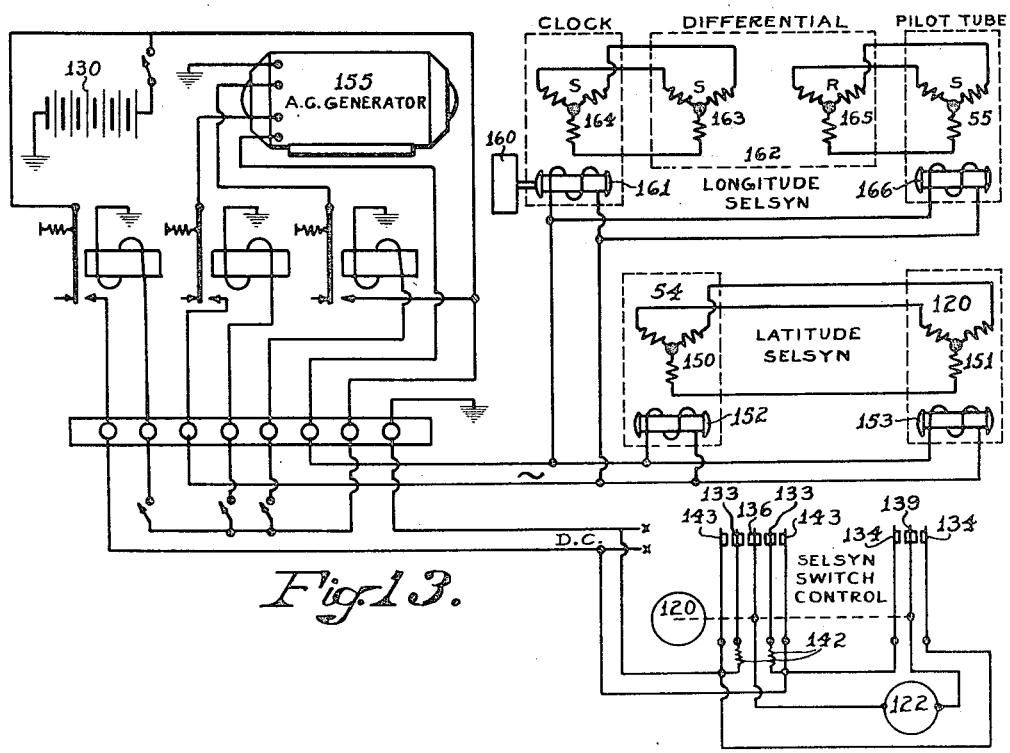
Inventor
Robert J. Herbold Patented Dec. 27, 1949

2,492,148

UNITED STATES PATENT OFFICE 2,492,148

AUTOMATIC NAVIGATING INSTRUMENT FOR CRAFT GUIDANCE

Robert J. Herbold, Denver, Colo., assignor to Lafayette M. Hughes, Denver, Colo.

Application May 13, 1947, Serial No. 747,875

21 Claims. (Cl. 318—489)

This invention relates to an automatic navigation instrument and more particularly to a device which indicates the latitude and longitude of a moving craft and may serve for the automatic guidance of the craft according to a plotted course.

In my copending application, Serial No. 735,030, filed March 15, 1947, I have described an instrument for automatically guiding a craft relative to a course plotted on a chart simulating a segment of the earth which is moved in a timed relation with the apparent movement of a celestial body on which a fix is maintained, and wherein a course follower is moved automatically relative to the course by a light seeking electronic device, so that latitude and longitude determinations of craft position are indicated on the moving chart and the craft is guided accordingly.

A primary object of this invention is to provide a simplified construction in which the charted course is suitably located on the craft at a point remote from the light pick up device.

A further object is to provide such a construction in which the chart is stationary and a course follower is movable relative thereto by a remote control mechanism governed by the electronic light pick up device which maintains a celestial fix.

A further object is to provide such a device in which the latitude and longitude of points on a course may be plotted in rectangular coordinates on any desired scale and wherein the course follower is moved according to that scale so as to give an instantaneous indication of craft position.

A further object is to provide electrically synchronized mechanism governed by an angularly movable, fix maintaining, electronic device, which moves the course follower relative to the charted course in accordance with differences in the angular positions of the electronic device caused by the craft movement.

In accordance with my invention, an astronomical fix is maintained by means of photo sensitive elements arranged to be moved automatically by their activation into a proper alignment with a light ray from a celestial body. Compensation is made for the apparent east to west motion of the celestial body as caused by the rotation of the earth and any variation from that apparent motion as is ascertained by the light pick up device is communicated through synchronized mechanism to a course follower which is moved automatically over the plotted course in correspondence with the craft movement. Latitude is determined by the inclination angle relative to a horizontal line of the axis about which the light pick up device revolves while maintaining its fix. Longitude is determined by the angle between the direction towards which the pick up device points at the instant position relative to its imaginary direction of pointing at zero longitude at the same time. The latitude and longitude of that course are preferably plotted on a flat surface in rectangular coordinates on any desired scale so that the movement of the course follower is proportional to the angular deviation of the light pick up device as caused by the craft movement. The course follower and chart which give a visual indication of craft position are also so constructed that the craft rudder may be controlled automatically by any deviation of the course follower from the path plotted on the chart.

Referring to the drawings which illustrate a preferred embodiment of this invention:

Fig. 2 is a top plan view of the chart and a course follower movable thereover;

Fig. 3 is a side elevation of the chart;

Fig. 4 is an enlarged detail of a course follower employed for visual indication of the craft position;

Fig. 5 is a plan view of the under side of the chart board;

Fig. 6 is a section taken on the line 6—6 of Fig. 2;

Fig. 8 is a section taken on the line 8—8 of Fig. 7;

Fig. 9 is a sectional detail of the course follower shown in Fig. 2;

Fig. 10 is an elevation of a Selsyn generator motor unit that controls the position of the course follower;

Fig. 11 is a section taken on the line 11—11 of Fig. 10;

Fig. 12 is a wiring diagram of the electronic circuits associated with the light pick up device;

Figure 14:
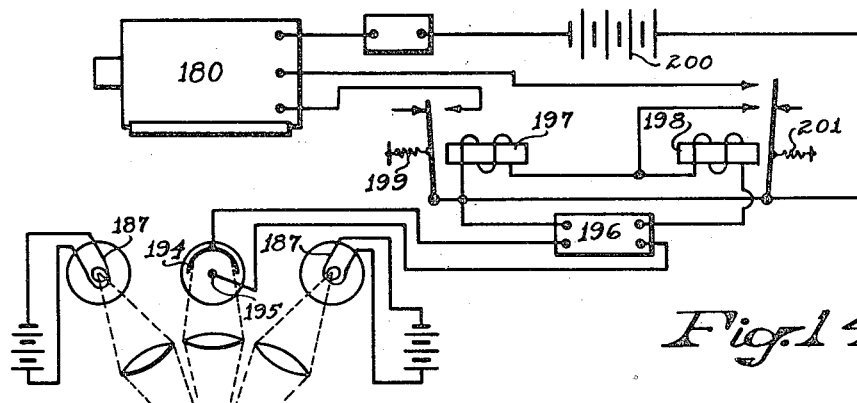

Fig. 13 is the wiring diagram of the Selsyn motor controls which interpret the position of the light pick up device as latitude and longitude of craft position and govern the position of the course follower accordingly; and Fig. 14 shows the wiring diagram of the electrical apparatus that controls the craft rudder as determined by the position of the course follower relative to a course plotted on the chart.

*Device for maintaining a celestial fix*

Figure 1:
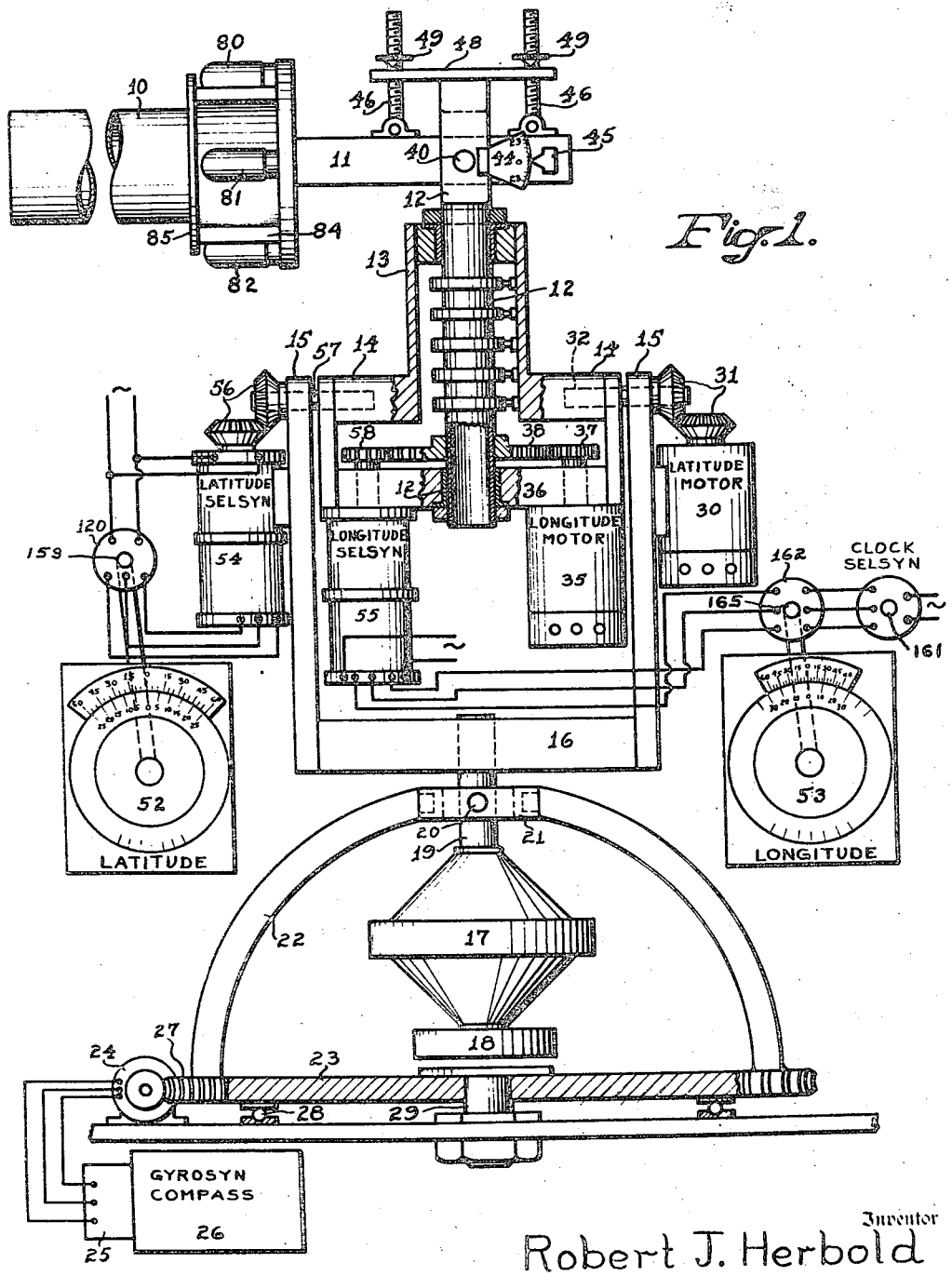
Fig. 1 is a vertical elevation, partly in section, showing the light pick up device and associated mechanism.

This apparatus comprises, as shown in Fig. 1, a light seeking device or pilot tube 10 which maintains a fix on a celestial body, such as the sun or a star or a group of stars, during the apparent east to west movement thereof as caused by the earth's rotation. In order that the light seeking device may be universally or equatorially mounted for maintaining that fix, it is carried on a supporting tube 11 which is mounted for a limited pivotal movement on a shaft 12 that swings the tube about the shaft axis. This shaft is rotatably mounted within suitable bearings carried by a tubular casing 13 which has axially aligned projecting trunnion supports 14 arranged at right angles to the shaft axis. According to the position of the parts shown in Fig. 1, the center line of the device 10 is at right angles to the axis of the shaft 12, and the trunnion axis is at right angles to the latter. The trunnions are supported by a yoke 15 which is held in a vertical position so that the light seeking device 10 may point to any portion of the sky and follow the apparent path of the celestial body.

The yoke arms 15 are carried on a support 16 that is stabilized by means of a suitable electrically driven gyroscope 17 and a weight 18, so that the motion of the light seeking device 10 may not be affected by any rolling or pitching of the craft. The vertical rod 19, which supports the base 16 of the yoke, is carried on a pin 20 mounted at its ends on a gimbal ring 21 pivoted on axially aligned trunnions on a supporting yoke frame 22. The latter is mounted on a turn table 23 which is arranged to be oriented so that the rocking trunnion axis is east and west and the shaft 12 may be tilted in a north and south plane. This is accomplished by means of a Selsyn or servomotor 24 controlled by a Selsyn generator 25 whose orientation is determined by a gyrosyn compass 26 or other suitable device. The shaft of motor 24 has a worm meshing with the worm gear 27 on the periphery of the turn table. Ball bearings 28 supporting the table and a center pin 29 projecting from the supporting table serve as a mount that permits the table to turn about a central vertical axis aligned with the axis of shaft 19. Various motor constructions commonly controlled by means of a gyrosyn compass may be used to hold the frame 22 oriented.

A suitable servo reversible D. C. motor 30, which is controlled by the light pick up device, is mounted on the yoke 15 and rotatably connected through bevel gears 31 with the shaft 32 that is pivotally supported in the yoke arms 15 and pinned to the trunnions 14. Any variation in the latitude position of the craft causes this motor 30 to rock the shaft 12 in its north and south plane and thus compensate for the latitude change in craft position and maintain the celestial fix. The light pick up device 10 is revolved about the axis of shaft 12 by means of the longitude motor 35. This motor is mounted on the under side of a swinging frame 36 secured to the casing 13 and trunnion supports 14. The shaft of motor 35 passing upwardly through the support 36 is connected through a gear 37 with a spur gear 38 keyed to the shaft 12.

Adjustment for declination of the sun is made by pivoting the support 11 so as to swing the light seeking device 10 to a position of 23.5° either side of a perpendicular to the axis of shaft 12. This pivotal mount comprises a pin 40 carried by the shaft 12 and on which the tubular support 11 is rotatably mounted. A scale 44 fixed on the side of the shaft 12 is marked with degrees up to 23.5° each side of a central zero position. It is associated with a pointer 45 fixed on the support 11, and the parts are so arranged that the light seeking device 10 may be angularly adjusted in accordance with the declination of the sun or other celestial body for the particular day of the craft movement. A vernier scale may be used. The support 11 is held in position by the two screw threaded rods 46 pivotally secured to the member 11 on opposite sides of the pin 40. These screw members pass upwardly through slots in a cross bar 48 secured on the top of the shaft 12, and the nuts 49 bearing on the cross bar may be adjusted to tilt the light seeking device according to the declination as determined by astronomical tables. Thus, if the gyrosyn compass 26 holds the axis of the aligned trunnion bearings 14 in an east and west position, then the shaft 12 may be tilted to that angle from the horizontal which makes its axis parallel with the earth's axis. Hence revolution of the support 11 about that tilted axis, after an adjustment is made for declination, causes the light device 10 to follow the celestial body movement.

An indication of the craft position as to latitude and longitude may be given by the latitude dial 52 and the longitude dial 53 by means of a latitude Selsyn generator 54 and a longitude Selsyn generator 55 and their associated synchronized motors as will be described. A variation in latitude, which is reflected in the tilting of the shaft 12 as required to maintain a celestial fix, may be communicated to the latitude Selsyn generator 54 through bevel gears 56 connecting with the bearing shaft 57 that is pinned to the left hand trunnion 14 and is mounted in the yoke arm. The longitude Selsyn 55 has its rotor shaft geared at 58 to the gear 38 keyed to the rotatable shaft 12. The Selsyn 55 is mounted on the under side of the rocking base 36. The latitude Selsyn 54 is carried on the side of the yoke 15.

*Electronic control of light pick-up device*

Figure 7:
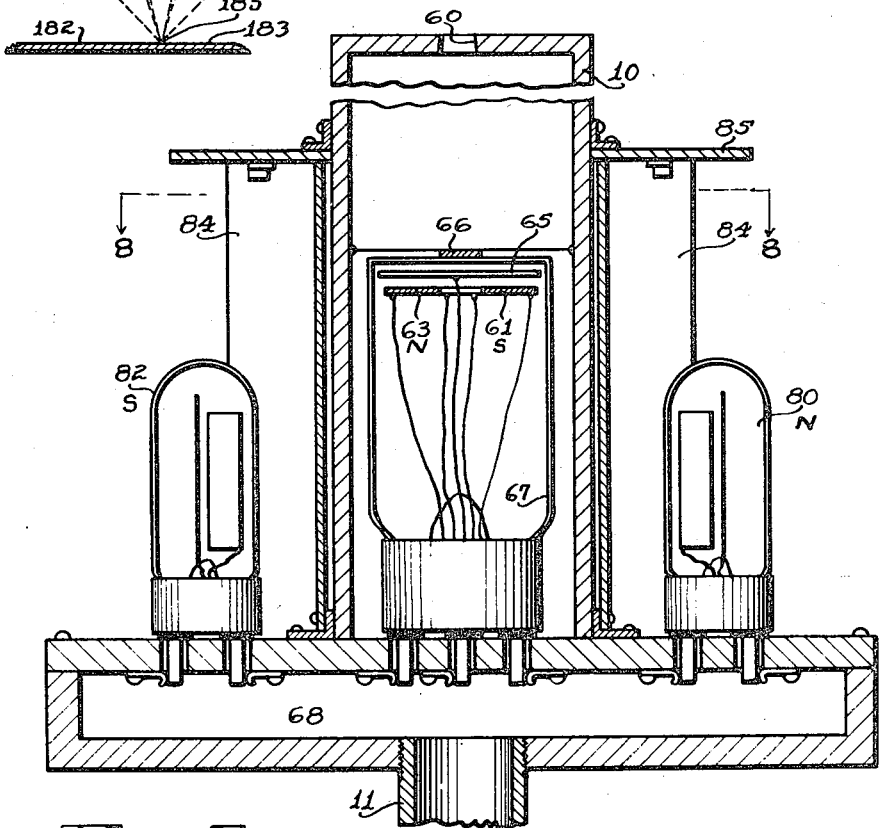
Fig. 7 is an enlarged sectional detail of the pilot tube and the electronic pick up cells of Fig. 1.

The light pick-up pilot tube (Figs. 7 and 8) 10 has a small aperture 60 at its outer end through which a ray of light from the sun or star may enter. A suitable optical system may also be used to gather and condense the light. This ray of light is intended to activate one or two of the four cathodes, 61, 62, 63 and 64 of a multiplex photocell located within the tube which has a common anode 65. The cathodes are preferably flat plates of suitable light activated material which are so arranged reversely in the four quadrants north, south, east and west that light coming from the north side of the axial line of the tube will strike the north cathode plate 61 and east light will strike the east cathode plate 62, and west and south lights will activate the other plates 64 and 63. These plates are spaced from one another and to provide a non-sensitive space therebetween. An opaque disk 66 is suitably mounted centrally of the tube above that space between the cathode plates, so that if the light ray is exactly central it will strike only the disk and no one of the cathodes; but if the light ray moves slightly to one side at a small angle, then it will strike one of the plates and activate the same. This photocell may be photo conductive, voltaic or emissive. It may be a photo emissive caesium oxide cell of standard construction protected by a glass envelope 67 and having the usual contact prongs projecting into a hollow base 68 carried on the tube 11 and provided with the required electric contacts as will be understood.

Referring to Fig. 12 showing a diagram of the wiring related to the electronic light pick-up, the south cathode 61, activated by light from a southerly angle, is connected through an amplifier 70 and associated battery circuit of standard construction with the anode 65. Similarly, the north light activated cathode 63 and anode 65 are connected through an amplifier 71; and the west and east light activated cathodes 62 and 64 connect with the anode through amplifiers 72 and 73. The north and south amplifiers 70 and 71 are connected with the two separate coils 74 and 75 of a double throw single pole relay having a movable contact arm 76 adapted to make a contact with one or the other of two terminals of the north and south latitude reversible D. C. motor 30 (Fig. 1) which swings the latitude adjusting shaft 12. Similarly, the east and west amplifier systems 72 and 73 are connected to the coils of a relay 78 which controls the east and west longitude reversible D. C. motor 35 that rotates the shaft 12. Each of these motors 30 and 35 is connected in a suitable D. C. circuit, such as one providing 24 volts. Hence, a reversal of the associated relay causes a reversal of direction of rotation of the motor.

Thus, if the sunlight, for example, enters the light tube 10 and strikes only the south cathode 61, it causes the reversible latitude motor 30 to move in such a direction as to swing the tube toward the south and to a centralizing position for the sun ray. If the sunlight hits the opposite cathode 63, then the motor 30 is rotated in the opposite direction. Similarly, the east and west cathodes 64 and 62 operate through the reversible D. C. longitude motor 35 to swing the arm 11 in the sun's direction as required to centralize the sun ray within the tube 10. This control of the light tube 10 is accomplished whether the craft is standing still or moving, since the motors are operated solely in accordance with the direction of the light, and the rotation of the earth or the craft movement does not interfere with the light pick-up. The opaque disk 66 is made the same size as the image of the light ray so that a slight deviation of the light will activate one of the cathodes.

In order to bring the light tube 10 initially into alignment with the sun rays from any position, I provide a suitable electrical hunting mechanism. A preferred construction comprises the four photo emissive cells 80, 81, 82 and 83 of standard type arranged outside of and around the pilot tube and 90° apart. See Figs. 7 and 8. These cells are separated from one another by the arcuate opaque light shields 84 which are so arranged that each tube is free to receive light mainly from a sector having a horizontal angle of less than 180°, so that east light, for example, will affect primarily the cathode of the east tube 81, while northeast light will strike the north and east tubes 80 and 81 but not the others. An annular shield 85 located above the cells and around the tube serves to prevent activation of the outside photocells when light enters the tube aperture 60 and activates the interior photocells. Thus the inner cells take over the control when the hunting action aligns the tube with the sun.

These outer hunting cells 80, 81, 82 and 83 connect respectively through suitable amplifying apparatus 84, 85, 86 and 87 with the coils of the two double throw single pole relays 88 and 89 as illustrated in Fig. 12. The left hand coil of the relay 88 is energized through the amplifier 84 when the north photocell 80 is activated by north light. The other coil of this same relay is connected through amplifier 86 with the light tube 82 that receives the south light. Similarly, the other relay 89 has its coils connected respectively through the amplifiers 85 and 87 with the photo tubes 81 and 83 which receive the east and west lights.

These light hunting cell circuits are connected with the two motors 30 and 35 that are actuated by the cells within the pilot tube 10. That is, the relay 89 of the east and west hunting system governs the longitude motor 35 that rotates shaft 12 and swings the arm 11, so that a north and east light activation of the hunting device swings the pilot tube 10 in an easterly direction by energizing the longitude motor 35. The other hunting system activated by the north and south light is connected with the latitude motor 30 so that it swings the shaft 12 in a north and south plane to make a latitude variation. Thus the activation of north and east cells causes both motors to swing the tube to the northeast. The hunting photocells outside of the pilot tube 10 will therefore serve to pull the light tube over to a position where the flange above the tubes cuts off the light, at which time the light will enter tube 10 and strike the inner cells. After the inner cells take control of the pilot tube, then the extraneous light striking the outside cells is immaterial. If desired, various other shield and cell arrangements may be provided to attain the proper hunting and control action. The photocells inside of the tube 10 do not take control of the movement of the pilot tube until they are activated by a direct ray of sunlight; and the amplifiers are regulated in accordance with the desired light intensity for proper operation of the relays.

*Charted course and follower.*

A primary feature of this invention involves indicating the path of the craft movement on a preferably flat chart that is located conveniently on the craft and is entirely separate from the light seeking device. This chart may have latitude and longitude lines plotted on any desired scale in accordance with equal angle spacings or by rectangular coordinates, so that the latitude and longitude are each measured according to equal angles between radial lines from the earth's center. Hence, on the chart 100 shown in Fig. 2, the earth's equator may be represented by a straight line 101 and the Greenwich meridian of zero longitude by another straight line 102 at right angles to the first and intersecting it at the center of the chart or at any other desired point. The line 102 may be located wherever desired, such as at the right hand edge of the chart, so that a plotted course will not be interrupted but may be shown as a continuous line. Thus, if the line 102 is considered to be the 180° meridian, then the line 103 represents a course going west from the point P at Philadelphia to a point S in South Africa. The line 104 represents a course going east from Philadelphia to the same destination, where the line 102 is the Greenwich meridian. The line 103 or other straight line, drawn on this chart is a rhumb line.

Since the chart may be made any convenient size, it may relate only to a desired small portion of the earth's surface so as to provide the maximum size of charted course that is permissible. There is no critical scale. A chart that is several feet in length could provide a plotted course from New York to Denver of very great accuracy, for example.

It will be observed that the vertical lines on the drawing correspond with longitude lines of the earth and that if one wished to travel north from any given position, his course would be indicated by a north or vertical line. Hence, the North and South Poles are represented by the top and bottom horizontal lines of the chart. Thus, a square near the North Pole line may represent only a short distance, but the latitude and longitude angles are equal to those near the equator. This type of chart makes it possible to plot the locations of two points quite accurately, depending upon the size of the chart; and that may be as large as is required for the purpose. A given course line is plotted according to latitude and longitude angles, and this makes possible the plotting of a given course with any desired variations down to the shortest distance or a great circle course.

The angular variations that are reported by the latitude and longitude Selsyn generators 54 and 55 may be employed to move a course follower or a spot of light over the chart to indicate the craft position. For example, the follower 105 (Fig. 2) may be moved bodily by Selsyn motors synchronized angularly with the Selsyn generators and arranged to translate the angular movement of the pilot tube 10 as linear movement of the follower or indicator relative to the chart.

The chart construction, shown particularly in Figs. 2 to 6, comprises a rectangular frame 106 carrying the horizontal flat chart board 100 on which the latitude and longitude may be suitably plotted. This frame has two opposed dovetailed slideways 107 (Fig. 6) parallel with the latitude lines; and two opposite slide members 108 and 109 have V's interfitted with the slideways. These slide members 108 and 109 are connected together by a bridge structure formed of two parallel round rods 110 which are located above the chart. These rods are fixed in the tops of two spaced vertical arms 111 and 112 which are respectively secured to the slide members 108 and 109.

The course follower may be a plate 115 (Fig. 4) mounted to slide on the rods 110, which is provided with a central opening 116 and a suitable scale mark which aids in reading the latitude scale marked on one of the slide rods 110. Cross hairs 117 within the opening 116 serve for indicating both latitude and longitude. This course follower is a visual indicator permitting a pilot or navigator to ascertain the latitude and longitude of his craft position by inspection of the position of the course follower.

If the craft is to be guided automatically to follow a plotted course then the follower 105 of Fig. 2 may be constructed as shown in Fig. 9 and hereinafter described.

The course follower is moved over the chart by moving the slide bars 110 toward the left or right (Fig. 2) and by moving the follower along the slide bars. This may be accomplished by motors controlled by the Selsyn generator motor sets and suitable mechanical devices. As shown, the movement of the course follower 105 along the slide rods 110 is governed by the Selsyn motor 120 (Figs. 2 and 13) which is mounted on the platform 123 projecting laterally from the upright 111 and its associated slide member 108. The Selsyn motor 120 is synchronized angularly with the latitude Selsyn generator 54 (Fig. 1), and the Selsyn set in turn controls the operation of a power or servo reversible D. C. motor 122 mounted on the platform 123. The Selsyn motor 120 reflects accurately an angular movement of the generator 54 that responds to any tilting of the shaft 12 of the light pick-up mechanism. If the gears 56 (Fig. 1) have a 1–1 ratio, then when the shaft 12 is tilted through 10°, the Selsyn generator 54 is given that same 10° angular movement, and this is transmitted to the Selsyn motor 120 of Figs. 2 and 10. A different gear ratio may be employed to multiply that angular tilt. The D. C. motor 122, which is driven by a suitable battery, transmits this angular variation to the course follower 105 by means of a drum 124 fixed on the end of the shaft of the servomotor 122. (Figs. 2, 3 and 10.) A cord 125 has its two ends secured to and wrapped around the two halves of the drum 124 so that rotation of the drum will move the cord in one direction or the other. A pulley 126 (Fig. 2) mounted on the opposite upright 112 is so located that the cord 125 passes around the same. This cord is adjustably clamped to the courser 105 by means of a set screw 127 as shown particularly in Fig. 4. This adjustment permits setting the courser in a correct latitude and longitude position as determined by nautical tables. Since the chart may be made of any desired size, the distance through which the courser moves may be adjusted by varying the gear ratio of the gears 56 of Fig. 1 or preferably by changing the diameter of the winding drum.

*Selsyn controls*

The Selsyn motor 120 operates a suitable delicate switch mechanism which controls the power to the reversible D. C. motor 122 from a suitable battery 130. The motor 122 has a permanent magnet field. The shaft of the servomotor 122 (Figs. 10, 11 and 13) carries two slip rings 131, which connect the motor with two laterally projecting pairs of spring arm contacts 133 and a pair of contacts 134 arranged radially on the arm 135 carried on the end of the winding drum 124. Each of the spring contacts 133 is arranged to be struck by one of two central contacts 136 suitably carried on opposite sides of the arm 138 projecting radially from the shaft of the Selsyn motor 120. The arm 138 also carries two contacts 139 arranged to strike one of the contacts 134. The slip rings 137 on the Selsyn motor shaft connect the battery with the contacts 137 and 139 on the arm 138. The two inner spring contacts 134 on arm 135 are so located as to be struck by a central contact 139 on the Selsyn arm 138 to complete the circuit when the upper contact 133 is struck by the member 136. The contacts 133 have resistances 142 in their circuits so arranged that when the shaft of the Selsyn motor 120 rotates through a slight angle to cause the contact 136 to strike a contact 133, one of the resistances 142 is interposed in the circuit to provide a slow starting and stopping speed. If the motor 120 moves rapidly or through a greater angle, one of the spring held contacts 133 moves over to strike an outer contact 143 mounted on the arm 135 back of the spring 133 and which is connected to short circuit the resistance 142 and cause the motor 122 to move more quickly. The construction is so arranged that the reversible motor 122 is rotated in such a direction, depending on which way the Selsyn motor rotates, as to move the courser 105 to indicate the change in latitude. This direction of courser movement also depends on the direction of winding the cord 125 on the periphery of the drum 124. The wiring circuits are such that if the Selsyn arm swings to the left (Fig. 11) it progressively makes the contacts which rotates the motor 122 in a given direction, and reversal in direction of the Selsyn rotor reverses the motor 122. As soon as the 122 motor starts, it releases the contacts and again breaks the circuit so that the motor can move only through a slight angle determined by the movement of the Selsyn motor.

The Selsyn generator and synchronous motor set may be made in accordance with standard practice. The generator and motor of the latitude determining set are identical in construction, and comprise stators 150 and 151 like a three phase induction motor. The rotors 152 and 153 each have a bobbin type of core provided with a single winding which is energized from a single phase source of alternating current. As shown in Fig. 13, the two rotors are connected in parallel with a source of alternating current conducted through suitable slip rings. The corresponding taps of the Y-windings of the two stators, are connected together. The alternating current for the rotors may be derived from the battery 130 which drives a D. C. motor A. C. generator set 155. The battery and the motor generator set may be connected with the Selsyn set through suitable switches and relays, as illustrated. In its operation, the rotor 152 of the latitude Selsyn generator 54 provides an alternating field cutting the windings of the stator 150 and thereby inducing a secondary current in that winding. This sets up a corresponding field polarity in the stator 151 of the Selsyn receiver 120 and the rotor 153 of the receiver has an induced field which is the same as that of the transmitter 152. Hence the rotor 153 of the synchronous motor will tend to stand at the same angle relative to its stator as does the rotor 152 of the generator set, and since the E. M. F. that is induced in each winding is equal, there is no circulatory current. If, however, the rotor of the transmitter is turned through a given angle, there will be a phase displacement between the E. M. F. induced in the transmitter and that in the receiver stator, and the resultant circulatory current between the two stator windings will pull the rotor of the receiving set to the same angular position as that of the rotor in the transmitter set. Hence any angular displacement of the latitude Selsyn 54 will be transmitted to suitably connected receiver Selsyn motors. The latter are located in any convenient position as required by the dial and chart mechanisms.

*Latitude determination*

The pilot tube 10 is automatically brought to that position in which it will follow the sun or a sideral fix, and to do this the axis of the shaft 12 must be parallel with the earth axis. That is, the axis of the shaft is tilted at that angle to a horizontal line which corresponds with the latitude of the craft. When the craft is at the equator, the shaft 12 is horizontal and at the North Pole the shaft is vertical. Hence, if a craft flies from the equator to the North Pole, the shaft will move through 90° from a horizontal to a vertical position.

The Selsyn motor 120 of Fig. 2 is synchronized as above explained with the Selsyn generator 54. Hence, as the shaft 12 is tilted, the gears 56 transmit this angular motion to the Selsyn generator 54 and the shaft of the Selsyn motor 120 has its shaft turned through the same angle. This rotation of the shaft of the Selsyn motor 120 causes the motor 122 to be energized and to wind the cable 125 and move the courser 105 in accordance with that change in angular position. The periphery of the drum 124 and the angular movement of the motor 122 are coordinated so that the movement of the courser 105 across the plotted angles of latitude on the chart correspond with the angular tilt of the shaft 12. As above stated, the chart may be plotted on any desired scale and adjustment made therefor in the winding drum circumference or in the ratio of the gears 56. Other types of control may be employed and to insure that the courser 105 is moved to the required distance and in accordance with the scale of the chart to indicate the angle through which the shaft 12 is tilted.

*Longitude determination*

Longitude is determined by comparing the observed angular position or pointing direction of the arm 11 (Fig. 1) which carries the light seeking tube 10 relative to the imaginary direction of pointing of a similar device located on the Greenwich or other meridian from which longitude is determined. This is readily accomplished by employing a chronometer which is set to run on Greenwich time and by comparing that time with the actual time where the craft is located as determined by the east and west angular position of the support 11. Philadelphia is located at approximately 75° west longitude and a clock there will show a time that is 5 hours earlier than that of Greenwich. The longitude of craft position at any time may be ascertained by means of a differential Selsyn unit having its stator governed by the clock and its rotor governed by the longitude Selsyn generator 55. Hence the clock 160 (Fig. 13) having Greenwich or other selected time is employed to rotate synchronously the rotor 161 of a Selsyn motor having a stator 164. Likewise, the Selsyn generator 55 controlled by the pilot tube angular position (Fig. 1) may be used to drive the rotor 166 of another Selsyn motor at its rate. The stators govern an auxiliary differential Selsyn unit 162 in which both stator 163 and the rotor 165 have three phase windings. The stator 163 has a Y-connection with the stator 164 of the Selsyn unit driven by the clock. The three phase winding 165 of the rotor of the differential Selsyn has its terminals similarly connected with the stator of the Selsyn generator 55 that is controlled by the pilot tube. The rotor 166 of the unit 55 is connected in parallel with the source of alternating current which energizes the rotor 161 of the clock driven unit, and with the connections so arranged that the two rotors tend to turn in such directions that the differential Selsyn 162 gives the algebraic sum of the angular positions of the two controlling rotors 161 and 166 and its rotor 165 gives the longitude angle of the craft. This resultant displacement of the rotor 165 may be employed to control the movement of the slide 110 that carries the courser (Fig. 2) or the angular position of the rotor 165 may be read directly on the longitude dial 53 mechanically connected to the rotor, with the aid of a vernier.

The auxiliary Selsyn unit 162 which carries the three phase rotor winding 165 is connected through a suitable switch control, such as is shown in Figs. 10 and 11, to control a suitable reversible D. C. motor 168 which in turn operates a winding drum 169. (Figs. 3 and 5.) This auxiliary Selsyn differential 162 and the driving motor 168 are suitably mounted on the under side of the chart board. A cable 170 has its two ends suitably wrapped on the winding drum 169, and pulleys 172 mounted on the under side of the chart board conduct the cable to positions where it may be adjustably secured by clamps 173 to the ends of the bridge structure 110 carrying the courser 105. This adjustment permits setting the courser at the exact position of the craft prior to its start, if the longitude is known; and in that case the Selsyn clock will be set to the exact solar time at that position of longitude so that the rotor 165 of the differential Selsyn will stand at the same angle as that of the rotor 161 of the clock Selsyn and of the rotor 166 of the longitude Selsyn 55 governed by the pilot tube 10. Then when the craft moves east or west, the two control Selsyns will get out of step and the angular difference will be shown by the differential Selsyn rotor. The size of the winding drum is proportioned in accordance with the size of the longitude scale on the chart to insure that the course follower is moved across the scale in an exact angular relationship to the craft movement relative to the earth longitude. The latitude and longitude measurements are also shown on standard dials provided with verniers that are observable by the pilot or navigator of the craft. These rotatable dials of these units 52 and 53 (Fig. 1) are directly connected to the shafts of the Selsyn receiver rotors 151 and 165 respectively. Hence the pilot has a direct vision indication of craft position as regards latitude and longitude. This aspect of my construction makes it possible for the transmission of this position intelligence to any part of the craft.

*Craft guidance mechanism*

In so far as above explained, the mechanism may be used for the guidance of a pilot or navigator who manually controls the craft. This apparatus is, however, constructed to control the guidance of the craft automatically, such as where one or more rudders of the craft may be operated electrically under the control of the reversible D. C. electric motor 180, Fig. 14. This motor is preferably connected through a Selsyn or servomotor system which governs the powerful motor capable of operating and holding the craft rudder in a desired position, as will be understood. The rudder is controlled to move through a pre-determined arc to such a position that the craft is slowly brought on course if it has deviated therefrom. This control is effected by an electronic apparatus, as shown primarily in Fig. 14, in which a spot of light 185 is projected by the courser 105 onto the chart at the exact point which indicates the craft position. This spot of light is employed to govern further electronic apparatus controlling the rudder which is so arranged that if the craft deviates from a plotted course it will be automatically returned to its direct line of travel. This is accomplished without computation of latitude and longitude and without actual knowledge of the craft's position at any instant.

For the automatic guidance of the craft, the chart is provided with two surfaces 182 and 183 immediately adjacent to the plotted line 104 which have different light reflective characteristics. The courser is provided with a self-contained illuminating system which throws a spot of light 185 onto one of the surfaces of the chart 100. The surface 182 may be a removable strip of material of medium or low light reflectivity but not of full light absorption, such as a matte surface on metal. The other removable strip 183 has a mirror surface or one of high reflectivity, such as may be made of polished metal. The mirror surface 183 may reflect about twice as much light as does the matte surface 182. These two strips serve to govern electronic apparatus which is activated differentially by the different light intensities reflected by the two surfaces. The line 104 between these two surfaces may be a black line having the effective width of the light spot 185 and which fully absorbs any light striking it, so that there is no reflection if the light spot touches only the line 104 when the craft is exactly on the course.

Referring to Fig. 9, the courser 105 may be made as a hollow body containing one or more light bulbs 187 arranged annularly within an opaque casing or light shield 188 shaped as a frustum of a cone. An internal annular shield 189 confines the light rays in the ring shaped space between the shields. A suitable lens and diaphragm system 190 condenses the light from these bulbs and focuses it as a fine point of light 185 on the surface of the chart 100. That light spot strikes the chart at the exact point which indicates the craft position, and it serves as a visual indication of the craft position if so desired by the pilot. For his convenience, the courser may be arranged to travel beneath a transparent chart surface so that the spot of light shows through. However, this aspect of the invention is intended for the automatic control of the craft and no one needs to see the light ray.

This light spot 185 controls electronic apparatus by being reflected back through a condenser lens 192 arranged within the tube 189 and the light thus collected is thrown onto the cathode 194 or sensitized surface of a suitable photo cell mounted inside of that tube 189. As indicated diagrammatically in Fig. 14, the cathode and a suitable anode 195 are connected through a suitable amplifier 196 and associated battery system which is arranged to operate a double relay system that controls the direction of rotation of the reversible direct current electric motor 180 that either governs the rudders directly or controls a further motor which controls the lateral guidance of the craft.

Various control systems may be employed for that purpose; but the one illustrated in Fig. 14 comprises a relay 197 which is actuated by the light spot 185 striking the lesser reflective light surface 182. The other relay 198 is governed by the movement of the light spot to the more highly reflected surface 183. Each relay has its contact arm resting in an open position when the light spot 185 strikes only the black course line 104, which has such a high absorption that not enough light is reflected back to activate the selected photocell. The spring 199 which holds the contact arm of relay 197 open is so adjusted that it closes when the light spot 185 moves to illuminate the strip 182 of low reflectivity. That is, the amplified current is strong enough to move the contact arm of the relay 197. At that time, the circuit will be so made that the motor 180, which is driven by a battery 200 or other suitable source of power, is rotated in such a direction as to cause the rudder to be so moved as to swing the craft back towards that course where the light spot will again fall wholly on the black line 104. The spring 201 of the other relay 198, which causes rotation of the motor 180 in the opposite direction, has such strength that the contact arm of the relay will close its circuit to the motor when the light spot 185 strikes the highly reflective surface 183. When this relay closes, it will at the same time short circuit the coil of the other relay 197. But when the darker surface 182 is activated, the spring 201 is so strong that this relay 198 cannot be acuated by the current provided by the battery and amplifier circuit. On the other hand, when the light hits the highly reflective surface 183 there is such a high activation of the photocell cathode 194 that a large amount of current is developed sufficient to close the circuit of relay 198 against its strong spring. Thus, this differential relay serves to reverse the current from battery 200 to the motor 180 as required to bring the craft back to and keep it on course. It will be understood that the metal strips 182 and 183 are replaceable by other strips cut in shape to fit the desired course line. Also that line may be straight or curved as desired.

The electronic devices of the various parts of the apparatus may be made and arranged in accordance with standard practice. The photocells of the pilot tube, both inside and out, are to be particularly sensitive to infrared light because of the necessity for picking up a celestial body during a stormy period. For example, I may use an argon gas filled photo emissive tube having a cathode of caesium on caesium oxide applied to a base of silver for activation by the rays from the sun. For a photo voltaic cell, I may use a copper oxide or photronic cell. A resistance cell may be of the selenium type, or I may use a thalofide cell having a platinum disk provided with a coating of thallium metal sensitized by oxygen and sulfur. Molybdenum sulfide is sensitive to infrared and may be employed. Various types of thermocouples may be employed. The term "light" as used herein applies to any electromagnetic wave or radiant energy derived from a celestial body and particularly the light within the range of the infrared and ultraviolet portions of the spectrum which will serve to maintain the required fix.

Operation

If it is desired to fly east from a point near Philadelphia, Pa., located at 40° N. latitude 75° W. longitude, to a point near Cape Town, South Africa, located at 30° S. latitude and 19° E. longitude, as represented by the points P and S on Fig. 2, it is merely necessary to plot accurately on the chart the exact positions of the two end points or at least the destination, and then draw the line 104 between these points. That line may be straight to represent a rhumb line course or it may be curved, such as is shown at the lower portion of line 104, if it is desired to fly in a given path or to avoid storm centers or local weather conditions or to go around cities or other locations. The two metal strips 182 and 183 have their edges cut to conform with the plotted course and they are removably fastened on the chart.

If the compass 26 is a magnetic north seeking compass and does not point to the true North Pole, then mathematical corrections may be made on the chart for this and other errors, as is known by navigators. All corrections are made in the plotted curve 104 and not in the mechanism or its controls. Even if the compass does not hold the axis of shaft 12 in a true north and south plane, yet the electronic pick-up mechanism will move the pilot tube to maintain its celestial fix in spite of any deviation of the magnetic pole from the true North Pole. The navigator merely plots the curve to make an accurate correction for this deviation at the point of destination.

It is, however, desirable that the gyrosyn compass 26 be capable of holding the supporting frame in an accurate position irrespective of variations in the craft movement. While various constructions may be employed, I prefer to use a Sperry "gyrosyn" self-synchronizing gyroscopic compass which includes a horizontal flux valve that detects magnetic lines of force of the earth's field and is arranged to seek the magnetic north and south. The direction sensed by the compass is transmitted electrically through a power amplifier to the servomotor 24. The high speed gyro is the rotor of a 3-phase induction motor, and a variable transformer pick-off detects angular movements of the turntable 23 and responds to stabilize and hold the turntable correctly oriented in spite of craft movements.

It is also feasible to swivel the frame 16 relative to the supporting rod 19, so that the frame will hold the shaft 12 in a true north and south plane, and thus correct for the magnetic deviation at the destination point. Since it is merely desired to reach a given point on the earth's surface, it is immaterial as to whether the charted course is properly plotted or what may be its shape, providing the destination is accurately plotted.

The pilot tube moves automatically under the control of the electronic pick-up mechanism to point it directly at the celestial body. Hence, it is not necessary that the latitude of the starting point be known. If the longitude or the difference in time between the starting point and Greenwich time is known, and the sun is the body on which the fix is maintained, then the chronometer 160 is set for the correct solar time at Philadelphia, so that the pilot tube pointing at the sun and the clock Selsyn each give the same angular reading and the differential Selsyn 162 agrees therewith at the time of starting. The navigator sets the courser 105 so that the light spot 185 falls exactly at P on the course 104. This is done by loosening the set screws 127 (Figs. 2 and 9) and 173 (Fig. 5) and adjusting the position of the courser without rotating drums 124 and 169 that control the position of the courser thereafter.

The longitude need not be known, since the courser may be set correctly at the starting point P and the clock 160 may be so adjusted as to give a zero reading on the differential Selsyn. This 24 hour clock 160 drives the rotor 161 of its associated Selsyn at the angular rate of rotation of the earth. Hence, if the craft is standing still, the differential Selsyn will maintain a zero reading; but when the craft moves to the east, the pilot tube swings to the west at a faster angular rate than that of the clock Selsyn rotor. The directions of rotation of two rotors of the clock Selsyn and the longitude Selsyn are considered as algebraically opposite in sign, so that if they both rotate through 45° in the same direction, their sum of +45° and −45° is zero, or the craft has not moved.

If during a trip, the clock Selsyn shows a total angular movement of 90°, or an elapsed six hours of time, and the longitude Selsyn has made an angular movement of 45° in the same direction, the algebraic sum of these angles is 45° which shows that the craft has moved 45° west. If the clock movement was 45° and the longitude Selsyn moved 135° in the same direction, this indicates an easterly travel of 90°. Similarly, the southerly variation of latitude causes the pilot tube to swing higher towards the zenith and thus rotates the latitude Selsyn and so causes the courser 105 to move in a southerly direction over the chart.

If the courser is exactly on the black line 104, then the craft rudder is not actuated by the motor 180 (Fig. 14) but if there is any deviation from that course line by the light spot 185, then the craft rudder is so turned as to move the craft back toward the plotted course. Hence this apparatus is fully automatic for guiding the craft to the destination point plotted on the chart.

Various modifications may be made of this construction within the scope of this invention, and the above disclosure is to be interpreted as setting forth the principles and my preferred embodiments thereof without imposing limitations on the appendant claims.

I claim:

1. A navigating instrument for craft comprising a light seeking electronic device which is automatically controlled by radiant energy directed from and movable to maintain a fix on a celestial body during the craft movement, a stationary chart remote therefrom, a course follower movable over said chart, and means controlled by a variation in movement of said device as it maintains the celestial fix which moves the course follower relative to the chart in accordance with the craft movement.

2. A navigating instrument for craft comprising a light seeking electronic device which is automatically controlled by radiant energy directed from and movable to maintain a fix on a celestial body during the craft movement, a chart having a surface in one plane on which the latitude and longitude angles of points on a course are plotted in rectangular coordinates, a course follower movable over said chart, and means controlled by a variation in movement of said device caused by the craft movement as the celestial fix is maintained which moves the course follower relative to the charted course in accordance with the craft movement.

3. A navigating instrument for craft comprising a movable light seeking electronic device which automatically maintains alignment with a light ray from a celestial body, a chart remote therefrom having a surface in one plane on which the latitude and longitude angles of a course are plotted in rectangular coordinates on a non-critical scale, a course follower mounted to move over the chart and electrical apparatus controlled by a variation in movement of said device between stationary and movable craft conditions which moves the course follower relative to the charted course in accordance with the craft movement.

4. A navigating instrument for craft having rudder control apparatus comprising a movable electronic light seeking device which automatically maintains a fix on a celestial body, a stationary chart remote from and independent of said device on which a destination is plotted on a non-critical scale, a course follower movable over the chart, means controlled by variations in movement of said device in response to a directional movement of the craft which causes the course follower to move over the chart in accordance with the instantaneous craft position and apparatus controlled by the movement of said follower relative to the destination which governs the rudder control apparatus.

5. A navigating instrument for craft comprising a movable electronic light seeking device which automatically maintains a fix on a celestial body, a chart having a surface in one plane on which the latitude and longitude angles of points on a course are plotted in rectangular coordinates on a non-critical scale, and means controlled by a deviation in movement of said device caused by the craft movement as the celestial fix is maintained for indicating the craft movement on the chart in linear measurements that are multiples of the angular latitude and longitude changes of craft position.

6. A navigating instrument for a craft having rudder control apparatus comprising a chart having a surface in one plane on which the latitude and longitude angles of a course are plotted in rectangular coordinates of a non-critical scale, an electronic light seeking device which automatically maintains a fix on a celestial body, means controlled by the variation in movement of said device between stationary and moving craft conditions which indicates an instantaneous craft position on the chart and means goverened by a variation in the charted craft position from the plotted course which governs the rudder control apparatus and causes the craft to bear towards the plotted course.

7. A navigating instrument for a craft having rudder control apparatus comprising a flat chart having latitude and longitude angles of a course plotted in rectangular coordinates on a selected scale, an electronic light seeking device which automatically maintains a celestial fix and moves through angles determined by variations in the craft's latitude and longitude, a course follower movable over the chart, means for translating variations in the angular movements of said device as linear movements of the course follower and moving the follower over the chart to give an instantaneous indication of craft position, and means governed by a departure of the follower from the plotted course which causes the rudder control apparatus to steer the craft towards the required course.

8. A navigating instrument for craft comprising an angularly movable electronic light seeking device, a universal support therefor, means governed by the device for moving it angularly in an east-west direction and to maintain a celestial fix, a chronometer driven member independent of said device and support which is rotatable in angular synchronism with the earth, and a differential mechanism controlled by a variation between the angular east-west movement of said device and the angular movement of said member which responds to a change in longitude of the craft.

9. A navigating instrument for craft according to claim 8 comprising a chart having a course plotted thereon, a course follower movable over the chart, and means governed by said differential mechanism for moving the course follower in response to a variation in longitude of the craft.

10. A navigating instrument according to claim 8 for craft having rudder control apparatus comprising a chart having a course plotted thereon, a course follower movable relative to said plotted course, means governed by said differential mechanism for moving the follower in response to a variation in longitude of the craft and mechanism responding to a deviation of the course follower from the plotted course which controls said apparatus.

11. A navigating instrument for craft comprising an electronic device activated by light directed from a celestial body, an equatorial mount therefor having a rotatable shaft, a support to tilt the shaft in a vertical plane and an angularly adjustable arm carrying the device which is adjustable for declination and is swung by rotation of the shaft about the shaft axis, means to hold the shaft in a north and south plane, motors governed by the device which rotate and swing the shaft and move the device to maintain a fix on said celestial body as the craft moves, an independent chronometer which rotates at the angular rate of earth rotation, a synchronized generator and motor set governed by variations in the angular tilted position of the shaft and arm caused by the craft movement which respond to latitude changes, differential mechanism responding to a variation in the angular rates of rotation of the shaft and the chronometer, a chart having a plotted course which is remote from said device, and means governed by said set and differential mechanism which indicates the craft position on the chart relative to the plotted course.

12. A navigating instrument according to claim 11 comprising a latitude Selsyn generator and motor set connected to synchronize with the angular tilting movement of the rotatable shaft and means governed by said set which responds to a change in latitude of the craft position and the resultant tilting movement of said shaft.

13. A navigating instrument according to claim 11 comprising a longitude Selsyn generator having a rotor responding to an angular swinging movement of the arm about the shaft axis as the fix is maintained, a chronometer driven Selsyn rotor synchronized with the earth rotation, and a differential Selsyn controlled by said Selsyn generators which responds to a difference in angularity between the rotors of said generators as the longitude of the craft is changed.

14. A navigating instrument for craft comprising an angularly movable electronic light seeking device, a universal support therefor motor driven mechanism governed by the device which causes the latter to maintain a celestial fix, a stationary chart remote from the device and its support which has a surface in one plane on which is plotted a course to a destination in latitude and longitude coordinates on a noncritical scale, means for moving a light spot relative to the plotted course in response to angular movements of the device so that the light spot indicates the craft position according to the scale of the chart and an electronic device responsive to a deviation of the light spot to one side of the plotted course.

15. A navigating instrument for craft comprising an angularly movable electronic light seeking device, means governed by the device for moving it to maintain a celestial fix, a remote chart having a surface in one plane on which the latitude and longitude of points on a course are plotted in rectangular coordinates, a course follower providing a spot of light which is movable over the chart, means for moving the follower and light spot in response to angular movements of the device caused by a change in latitude and longitude of the craft, light reflective surfaces defining the plotted course and electronic control apparatus which is governed by a deviation of the light spot from the plotted course onto one of said surfaces.

16. A navigating instrument for craft having rudder control apparatus comprising an angularly movable electronic light seeking device and associated mechanism to maintain a celestial fix, a stationary chart remote from the device having a surface in one plane on which the latitude and longitude of points of a course are plotted in rectangular coordinates, a course follower providing a light spot on the chart, means governed by angular movements of the device caused by variations in craft latitude and longitude which moves the light spot to a position on the chart corresponding with the craft position and an electronic device responsive to the light spot departing from the plotted course which causes the rudder control apparatus to guide the craft towards the intended course.

17. A navigating instrument for a craft comprising a universally mounted light activated pick up device which is automatically controlled by radiant energy directed from and points towards a celestial body during the craft movement, a stationary chart remote from and independent of said device, a course follower mounted to move over the chart, and means including synchronized electric motor mechanism angularly responsive to movements of the pick up device which causes the follower to move in a definite relation to and simultaneously with the angular movement of said device and to be positioned according to the instantaneous craft position.

18. A navigating instrument for a craft comprising an electronic device which is activated by direct light from a celestial body, means including an equatorial mount having a rotatable shaft carrying the device and a tiltable support for the shaft whereby the axis of the shaft may be tilted in a north and south plane, mechanism governed by activation of said device which rotates and tilts the shaft to maintain a fix on said body as the latitude of the craft changes, a stationary chart remote from said mount on which a course is plotted, a course follower movable over the chart, and a synchronized electrical generator and motor mechanism connecting said follower and tiltable support so that the follower moves over the chart as the shaft axis is tilted according to a latitude variation of craft position.

19. A navigating instrument according to claim 18 comprising an independent chronometer mechanism which rotates at the angular rate of the earth rotation, two synchronized generator and motor sets connected respectively to the chronometer mechanism and the shaft, a differential mechanism governed by said synchronized sets which responds to the angular differences therebetween, and means whereby the differential mechanism causes the course follower to move over the chart according to a variation in longitude.

20. A navigating instrument for a craft according to claim 11 comprising a course follower governed by the differential mechanism and the generator motor set which is movable over the chart in a definite relationship to the angular movement of the light activated device and means on the follower which indicates the craft position relative to the course on the chart.

21. A navigating instrument according to claim 11 for a craft having a motor driven rudder control apparatus comprising mechanism governed by a deviation of the indicated craft position from the plotted course which causes said apparatus to steer the craft towards the charted course.

ROBERT J. HERBOLD.

REFERENCES CITED

The following references are of record in the file of this patent:

UNITED STATES PATENTS

| Number | Name | Date |
|---|---|---|
| 1,016,240 | Alexieff | Jan. 30, 1912 |
| 2,102,512 | Chance | Dec. 14, 1937 |
| 2,155,402 | Clark | Apr. 25, 1939 |
| 2,354,917 | Jones | Aug. 1, 1944 |
| 2,419,641 | Hart | Apr. 29, 1947 |
| 2,424,193 | Rost | July 15, 1947 |